United States Patent
Morgan et al.

(10) Patent No.: US 10,705,832 B2
(45) Date of Patent: Jul. 7, 2020

(54) EFFICIENT STORAGE AND ANALYSIS OF SOURCE CODE MODIFICATION HISTORY DATA

(71) Applicants: Atlassian Pty Ltd, Sydney (AU); Atlassian, Inc., San Francisco, CA (US)

(72) Inventors: Benjamin Morgan, Brisbane (AU); James Navin, Sydney (AU); Rodrigo Berto, Sydney (AU); Gene Taylor, Sydney (AU); Djani Derviskadic, Sydney (AU); Boris Gvozdev, Sydney (AU); Ian Dick, San Francisco, CA (US)

(73) Assignee: ATLASSIAN PTY LTD, San Francisco, CA (US)

( * ) Notice: Subject to any disclaimer, the term of this patent is extended or adjusted under 35 U.S.C. 154(b) by 0 days.

(21) Appl. No.: 16/365,598

(22) Filed: Mar. 26, 2019

(65) Prior Publication Data
US 2020/0104121 A1 Apr. 2, 2020

Related U.S. Application Data

(60) Provisional application No. 62/737,993, filed on Sep. 28, 2018.

(51) Int. Cl.
*G06F 8/71* (2018.01)
*G06F 16/23* (2019.01)
*G06F 16/245* (2019.01)

(52) U.S. Cl.
CPC ............ *G06F 8/71* (2013.01); *G06F 16/2379* (2019.01); *G06F 16/245* (2019.01)

(58) Field of Classification Search
CPC ....... G06F 8/71; G06F 16/245; G06F 16/2379
(Continued)

(56) References Cited

U.S. PATENT DOCUMENTS 10,303,469 B1 *  5/2019  Neatherway .............. G06F 8/77
2014/0289704 A1 *  9/2014  Viswanathan ............ G06F 8/71
                                                             717/123
(Continued)

OTHER PUBLICATIONS

Edwards et al., "Sciit: Aligning Source Control Management and Issue Tracking Architectures" IEEE, 2019, 4pg. (Year: 2019).*
(Continued)

*Primary Examiner* — Ryan D. Coyer
(74) *Attorney, Agent, or Firm* — Hickman Palermo Becker Bingham LLP

(57) ABSTRACT

In one embodiment, a computer-implemented method comprises receiving, at a server computer, a plurality of commit records of a source code management system (SCM), wherein a first commit record of the plurality of commit records includes a first parent commit identifier (ID) that identifies a parent commit record of the first commit record; storing, in one or more data repositories, a full commit record for each commit record of the plurality of commit records; in response to determining that the first commit record includes a parent commit ID, storing, in the one or more data repositories, a first partial commit record for the first commit record, wherein the first partial commit record comprises a partial commit record that is identified by the first parent commit ID; generating and submitting a database query to a digital data repository associated with the SCM, based on determining that a partial commit record is stored in the one or more digital repositories, and receiving first partial commit update data for the first partial commit record; updating, based on the first partial commit update data, one or more fields of the first partial commit record to convert the first partial commit record into an updated commit record, wherein the updated commit record comprises a full commit record.

20 Claims, 4 Drawing Sheets

(58) Field of Classification Search
USPC .......................................................... 717/122
See application file for complete search history.

(56) References Cited

U.S. PATENT DOCUMENTS

| | | | | |
|---|---|---|---|---|
| 2014/0297592 | A1* | 10/2014 | Ohtake | G06F 16/219 707/638 |
| 2015/0007153 | A1* | 1/2015 | Martinez | G06F 8/443 717/159 |
| 2018/0121174 | A1* | 5/2018 | Phillips | G06F 8/36 |

OTHER PUBLICATIONS

Pryce, N., "Deft: Easy Distributed Feature Tracking," Github.com, 2011, 2pg. (Year: 2011).*
Schimpf, Jim, "Fossil Version Control a Users Guide" Pandora Products, 2010, 115pg. (Year: 2010).*
Swapnilm, J., "git-issue," Github.com, 2018, 7pg. (Year: 2018).*

* cited by examiner

EFFICIENT STORAGE AND ANALYSIS OF SOURCE CODE MODIFICATION HISTORY DATA

BENEFIT CLAIM

This application claims the benefit under 35 U.S.C. § 119(e) of provisional application 62/737,993, filed Sep. 28, 2018, the entire contents of which are hereby incorporated by reference for all purposes as if fully set forth herein.

FIELD OF THE DISCLOSURE

The technical field of the present disclosure generally relates to improved methods, computer software, and/or computer hardware in the field of computer program source code repositories.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An issue tracking system (ITS) is a system used to manage work items or "issues". Example ITSs include JIRA, JIRA Service Desk and JIRA Software which are commercially available from Atlassian Pty Ltd., Sydney, Australia. ITSs are deployed in a wide variety of applications including organizational customer support call centers and for software development teams to use in project management and bug tracking. When deployed for software development projects, an ITS may be used with other systems, such as source code management (SCM) systems (also known as 'revision control' or 'version control systems'). These are used to track and manage computer program source code as the code is written and revised. Although SCM systems are predominantly used to track source code they can be used to track other data.

Examples of SCM systems include systems such as MERCURIAL, GIT and Bitbucket (commercially available from Atlassian Pty Ltd). Generally speaking, SCM systems store data—typically source code—in repositories and facilitate access to that data from multiple different client systems. In order to work on a project, a user (using a client system) creates a local copy of the relevant data (e.g. program source code) from a repository and works on that local copy. If the user makes changes that are to be incorporated into the remote version of the data, the user's local copy of the data—or at least those portions that have been changed—is written back to the repository using the SCM system. The SCM system controls access to the repository data and also manages version control for the data.

SCM systems typically manage and track numerous documents/source code files across multiple repositories and for numerous users. These documents/files managed by SCM systems can be changed frequently as users add new documents/files, delete documents/files, and make changes to existing documents/files.

ITSs and SCMs are separate systems that provide independent functionality. In certain cases, they can be integrated and communicate with each other. Data may be shared and synchronized between systems, allowing information from one system to be linked with and displayed on the other system.

Synchronizing data between and ITS and SCMs requires processing large streams of data. Disruptions in synchronization processes often occur and can be caused by network issues, outage of service of one of the ITS and SCMs, or bugs in code that is utilized by the synchronization procedures. Disruptions can lead to storing fragmented data and in some cases, wasting of compute resources by having to restart a synchronization process from the beginning.

Techniques are desired to effectively mitigate the effects of synchronization disruptions.

DETAILED DESCRIPTION

Figure 1:
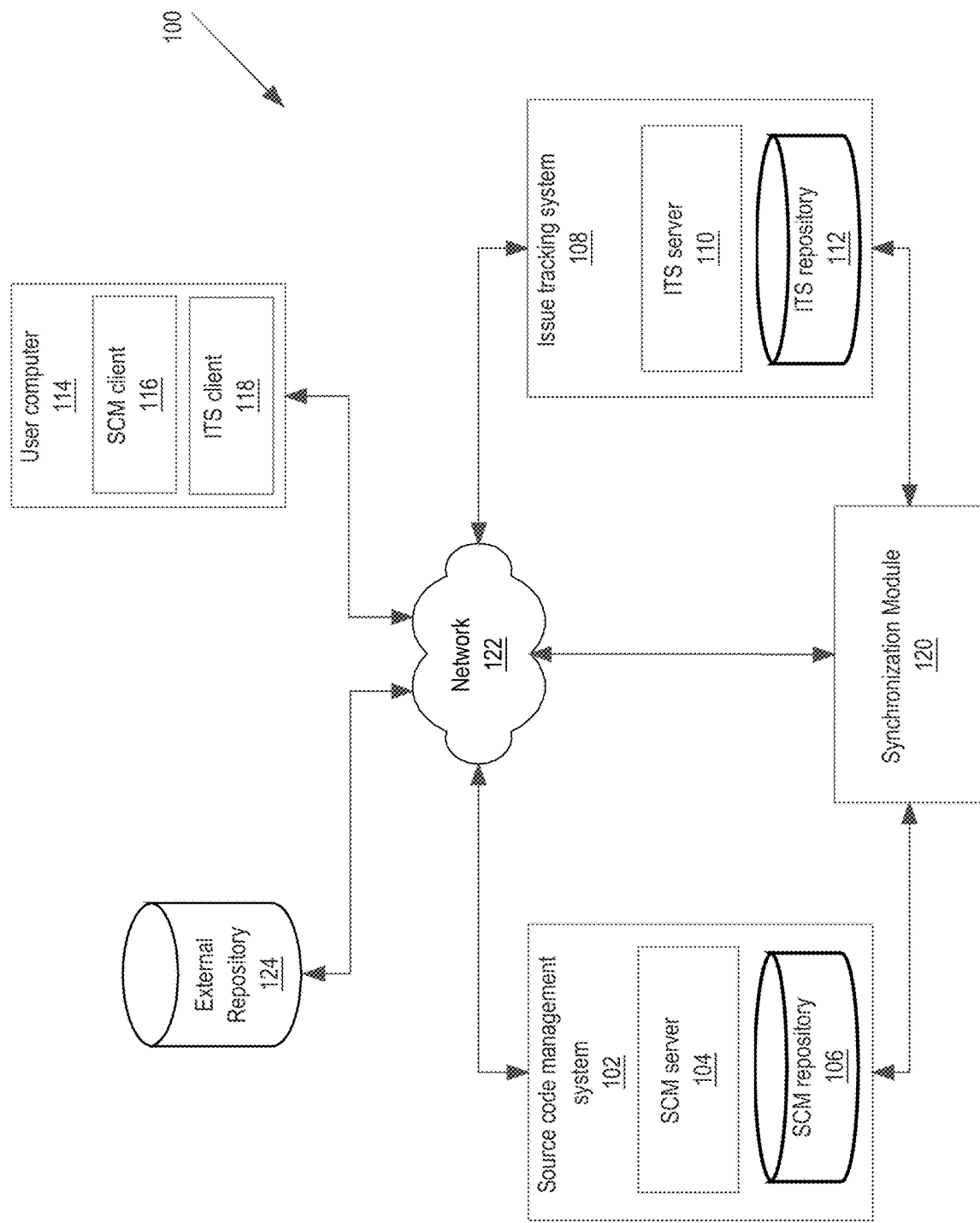
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. OVERVIEW
2. EXAMPLE COMPUTER SYSTEM IMPLEMENTATION
3. EXAMPLE FUNCTIONAL IMPLEMENTATION
4. HARDWARE OVERVIEW
5. EXTENSIONS AND ALTERNATIVES

1. Overview

Data from an ITS and SCM system can be synchronized. In this context, synchronization is defined as creating associations between commit records from an SCM system and issues from an ITS. Data is synchronized so that it can be organized into quick access tables or databases as part of an integration between an ITS and SCM system. As an example, data is synchronized so that relationships between issues from an ITS and code commits from a SCM systems can be quickly and adequately displayed to users via GUI.

As discussed previously, synchronizing data between an ITS and SCM system requires processing large amounts of data. While processing large amount of data from two different systems over a network, disruptions are inevitable. To mitigate disruptions of a synchronization process, computer-implemented techniques are provided for efficiently storing and analyzing source code modification history data.

In various embodiments, techniques comprise receiving, at a server computer, a plurality of commit records of a source code management system (SCM), wherein a first commit record of the plurality of commit records includes a first parent commit identifier (ID) that identifies a parent commit record of the first commit record; storing, in one or more data repositories, a full commit record for each commit record of the plurality of commit records; in response to determining that the first commit record includes a parent commit ID, storing, in the one or more data repositories, a first partial commit record for the first commit record, wherein the first partial commit record comprises a partial commit record that is identified by the first parent commit ID; generating and submitting a database query to a digital data repository associated with the SCM, based on determining that a partial commit record is stored in the one or more digital repositories, and receiving first partial commit update data for the first partial commit record; updating, based on the first partial commit update data, one or more fields of the first partial commit record to convert the first partial commit record into an updated commit record, wherein the updated commit record comprises a full commit record.

In some embodiments, the updated commit record includes a second parent commit ID. The method further comprises: in response to determining that the updated commit record includes a parent commit ID, storing, in the one or more data repositories, a second partial commit record for the updated commit record, wherein the second partial commit record comprises a partial commit record that is identified by the second parent commit ID; generating and submitting a database query to a digital data repository, based on determining that a partial commit record is stored in the one or more digital repositories, and receiving second partial commit update data for the second partial commit record; updating, based on the second partial commit update data, one or more fields of the second partial commit record to convert the second partial commit record into a full commit record.

In some embodiments, the method further comprises generating and causing displaying, at a computer, a digital data display that indicates a commit history of an issue. The commit history of an issue may include one or more commit records associated with an issue key of the issue, the one or more commit records including the first commit record and updated commit record. The first commit record and updated commit record may be displayed in a chronological ordering that indicates a parent-child relationship between the first commit record and updated commit record.

Using the above described techniques, a robust data hole-filling process is provided that is able mitigate the effects of synchronization disruptions. By effectively dealing with disruptions, the techniques herein permit synchronizing data between systems with fewer CPU cycles and less memory needed. Further, the techniques herein provide a failsafe approach of synchronizing data between systems that ensures the precise completion of large-scale synchronization procedures.

Other embodiments, aspects and features will become apparent from the disclosure as a whole.

2. Example Computer System Implementation

FIG. 1 illustrates a system in which the techniques described may be practiced, according to one embodiment.

FIG. 1 illustrates, at a high level of generality, the systems involved in implementing the embodiments described herein. In broad terms, the embodiments include an issue tracking system (ITS) 108, a source code management (SCM) system 102, and a synchronization module 120, further details of which are provided below.

The SCM system 102 maintains repositories of source code files and other materials pertaining to individual software development projects. In the course of developing a project using an SCM, users of user computer 114 take certain actions with respect to a repository that result in events occurring in the SCM system 102. Information about these SCM-repository events is stored in the repository along with the other information that is necessary for the SCM system 102 to document revisions made to the source code files as well as the general course of development of the project.

The SCM system 102 includes a SCM server 104 and SCM repository 106. The SCM server 104 receives/responds to client requests and communicate with the SCM repository 106 to retrieve/store data. The SCM system 102 stores data in the SCM repository 106 and manages the content of the SCM repository 106. The SCM repository 106 may include various files (e.g. source code files) and associated file and/or repository metadata.

User computer may execute a SCM client 116 to perform various functions associated with the SCM system 102. The user computer 114 may be any suitable device, for example a desktop computer, a mobile device (e.g. a tablet or mobile phone), or a portable device (such as laptop computer). Only one user computer 114 has been illustrated, but normal operation of the SCM system 102 typically involves many more user computers connected to the SCM system 102 to access data from/write data to SCM repository 106.

The SCM client 116 is executed by a processor of the user computer 114 to perform various functions in order to bring about the occurrence of events. By way of example, some functions performed by the SCM client 114 include creating local repositories; modifying, adding or deleting files in the local repositories; committing/pushing changes made in the local repository to the SCM system 102; fetching (e.g. pulling) files from the SCM repository 106; providing a user interface for reading/writing source code; etc.

Generally speaking, a user computer communicates with the SCM system 102 to 'push' data (e.g. source code files) to a SCM repository 106 (i.e., send any changes made to the locally stored files to the SCM system 102 for storage in the appropriate SCM repository 106) or 'pull' data from the SCM system 102 to be stored locally (i.e., fetch changes/files/repositories from the SCM repository to merge in a local database). The SCM system 102, in turn, is configured to receive pushed data from the user computer and send requested data to the client devices. In addition, the SCM system 102 is configured to notify the synchronization system 120 whenever content in the SCM repository 106 is modified and to respond to requests from the synchronization system 120.

During software development, common events occurring in a SCM repository 106 include (adopting Git terminology) commits, branches and pull requests. Other events occurring in a SCM repository 106 are failed builds. Software developers are well aware of these actions/events, but a high-level description is provided for reference.

Generally speaking, a commit adds changed source code files to the SCM repository 106. Commits are usually kept in the SCM repository 106 indefinitely. When users clone a repository, they will receive the latest committed versions of the source code files, unless they specify they wish to retrieve a previous version of the source code in the repository.

Pull requests are a mechanism for developers to notify team members that a particular feature has been completed. Once the feature branch is ready, the developer files a pull request via user computer 114. This serves as a notification to others that code is requiring review before it can be merged into the relevant branch of the repository.

A branch represents an independent line of development. Branches serve as an abstraction for the edit/stage/commit process and can be thought of as a way to request a new working directory, staging area, and project history. New commits are recorded in the history for the current branch, which results in a fork in the history of the project.

In the embodiments described below, commit identifiers (IDs) are used to identify commit records. In Git, for example, when a user makes changes to a source code file and wishes to upload those changes to the SCM system 102, the user "commits" the changes and a commit record is created and stored in the SCM repository 106.

Each commit record is associated with a commit ID, which is a check-sum of the contents of a file or directory structure when the user commits the changes. The mechanism used for calculating this checksum is SHA-1 hash, which is a 40-character string composed of hexadecimal characters and calculated based on the contents of the file or directory structure. A commit ID, therefore, uniquely represents a state of the SCM repository at a particular point in time.

Commit records may store a variety of information in one or more fields of the respective commit record. Such information may include author information, a commit message that comprises metadata about the commit, a set of issue keys associated with the commit, and parent commit IDs that identify parent commits of a respective commit.

Communications between the user computer 114 and the SCM system 102 are via the communications network 122. For example, the user computer 114 may communicate with the SCM system 102 through a local area network (LAN) of an enterprise in one embodiment.

An issue tracking system (ITS) is a system used to manage work items or "issues". ITS 108 comprises an ITS server 110 and ITS repository 112.

ITS server 110 stores or has access to ITS data. ITS data generally includes: ITS metadata defining the operation of the ITS (for example, issue type definitions, issue workflows, user permissions and the like); and issue data (i.e. data in respect of issues that have been entered into, and are being maintained by, the ITS). In this example ITS data is stored on and managed by a database 108, though it could be alternatively stored, for example on a local file system of the server computer 102. In some embodiments, ITS repository 112 is provided by a database server which may be hosted by ITS server 110, but will more typically be hosted on a separate physical computer in communication (directly or indirectly via one or more networks) with ITS server 110.

A user computer 114 may execute an ITS client to perform various functions associated with the ITS system. An ITS client 114 may be a general web browser application (such as, for example, Chrome, Safari, Internet Explorer, Opera). In this case the client 114 accesses the ITS server 104 via an appropriate uniform resource locator (URL) and communicates with the ITS server 104 using general world-wide-web protocols (e.g. http, https, ftp). The web browser application is configured to request, render and display electronic documents that conform to a markup language such as HTML, XML or extensions, and may be capable of internally executing browser-executable code such as JAVASCRIPT, VBScript, or other forms of code. Where the ITS client 114 is a web browser, the ITS server 104 will be a web server (such as, for example, Apache, IIS, nginx, GWS).

Alternatively, the ITS client 118 may be a specific application programmed to communicate with ITS server 110 using defined application programming interface (API) calls. In this case the ITS server 110 will be a specific application server configured to interact with the ITS client 118 application.

The type(s) of issues handled by an ITS can vary greatly depending on the scenario in which the ITS is implemented. In a software development scenario, however, "issues" may for example be bugs, features currently under development, and/or features intended for future development. Many alternative implementations and types of issues are possible.

In order to manage issues, an ITS 108 maintains metadata (for example in a relational database) which defines various operational parameters. ITS metadata can include, for example: one or more issue type definitions, each issue type definition defining a field scheme or field configuration for issues of that type (e.g. the possible fields or data to be maintained by the ITS for issues of a given type); one or more workflow definitions, a workflow definition defining the workflow that applies to an issue of a particular type (e.g. the states an issue can take and the manner in which an issue transitions between those states over its lifecycle); and user permissions (e.g. which users may create issues, view issues, amend issues, change the states of issues etc.). In some cases, the ITS 108 may allow the user to change the metadata—e.g. to define new/different issue types, issue type definitions, and/or workflows.

The actual fields defined with respect to an issue type will depend on the requirements of a given ITS implementation. By way of example an issue type definition may define the following fields: a project field storing a project to which an issue belongs; a key field storing a unique identifier for an issue; a description field storing a description of an issue and actions taken with respect to the issue; a status field indicating the stage an issue is currently at in its lifecycle; an assigned person field indicating who (if anyone) an issue has been assigned to; a severity field storing the severity of an issue (e.g. critical, major, minor, etc.); a priority field storing the priority of an issue at a general level (e.g. very high, high, medium, low, very low); and a rank field storing a rank value in respect of an issue (defining a rank order of the issue relative to other issues).

In order to create and progress issues in ITS 108, users interact with appropriate user interfaces provided by an ITS client 118. For example, a user may create a new issue and provide relevant information in respect of the issue (e.g. a particular project the issue is associated with, a description, a priority, any other relevant information catered for). The ITS 108 itself will typically generate an issue key that can be used to uniquely identify the issue, which may be hidden from or visible to the user. Once an issue has been created a user can interact with it, for example by adding additional information to the issue (e.g. in an issue description or other field), changing the state of the issue (e.g. from in progress to resolved), assigning the issue to another person (e.g. by changing an assigned person field).

In addition to communicating with user computer 114, ITS 108 and SCM system 102 are in communication with each other by way of the synchronization module 120. Synchronization module 120 is illustrated in FIG. 1 as a unit that is separate to ITS 108 and SCM system 102. However, skilled addresses will realize that the module could be integrated (either at the software or hardware level) into the ITS 108.

In software development projects, an ITS 108 and an SCM 102 may be used in conjunction via the synchronization module 120. For example, an issue defined in the ITS 108 may relate to a particular feature that is under development for a software product. The source code for the software product being developed is maintained in a particular SCM repository 106 (and potentially in a particular branch of that repository). In such cases, there are advantages to associating issues with relevant SCM repositories and, using that association, providing development status information via the ITS 108. By doing so users are provided with additional relevant information in respect of issues directly from the ITS 108; that is to say without having to leave the ITS 108, access the SCM system 102, and obtain the information from there.

One way of associating issues maintained by an ITS 100 with an SCM system 502, is by use of issue identifiers or keys. As noted above, each issue maintained in an ITS 108 is provided with a unique issue identifier. This issue identifier can readily be associated or linked with SCM actions or events that are relevant to the issue. For example, the ITS issue key can be included in a branch name, a commit message, a pull request, and/or other relevant ITS events.

When a SCM action/event associated with a particular issue occurs, the SCM system 102 is configured to make information in respect of the event available to the synchronization module 120 and/or ITS 108. This can be achieved in a number of different ways. As one example, and in certain embodiments, SCM system 102 is configured to use webhooks that are triggered when an ITS issue key is associated with an SCM action or event. The webhooks are designed to notify the synchronization module 120 and/or ITS (by way of an HTTP request to a suitable URL endpoint) of the association and provide the synchronization module 120 and/or ITS 108 with details of the specific SCM action/event. Correspondingly, the synchronization module 120 and/or ITS 108 is configured to listen for communications arriving on the designated URL and store the provided information in the particular project referenced by the ITS key.

In another example, synchronization module 120 may include instructions that are programmed or configured to scan each commit record stored in the SCM repository 106 and determine if a commit message associated with each commit record includes an issue key. If a commit message of a commit record includes an issue key, using techniques described herein, the synchronization module 120 may create associations between commit records and issue keys and store the associations in an external repository 124 or ITS repository 112.

3. Example Functional Implementation

Figure 2:
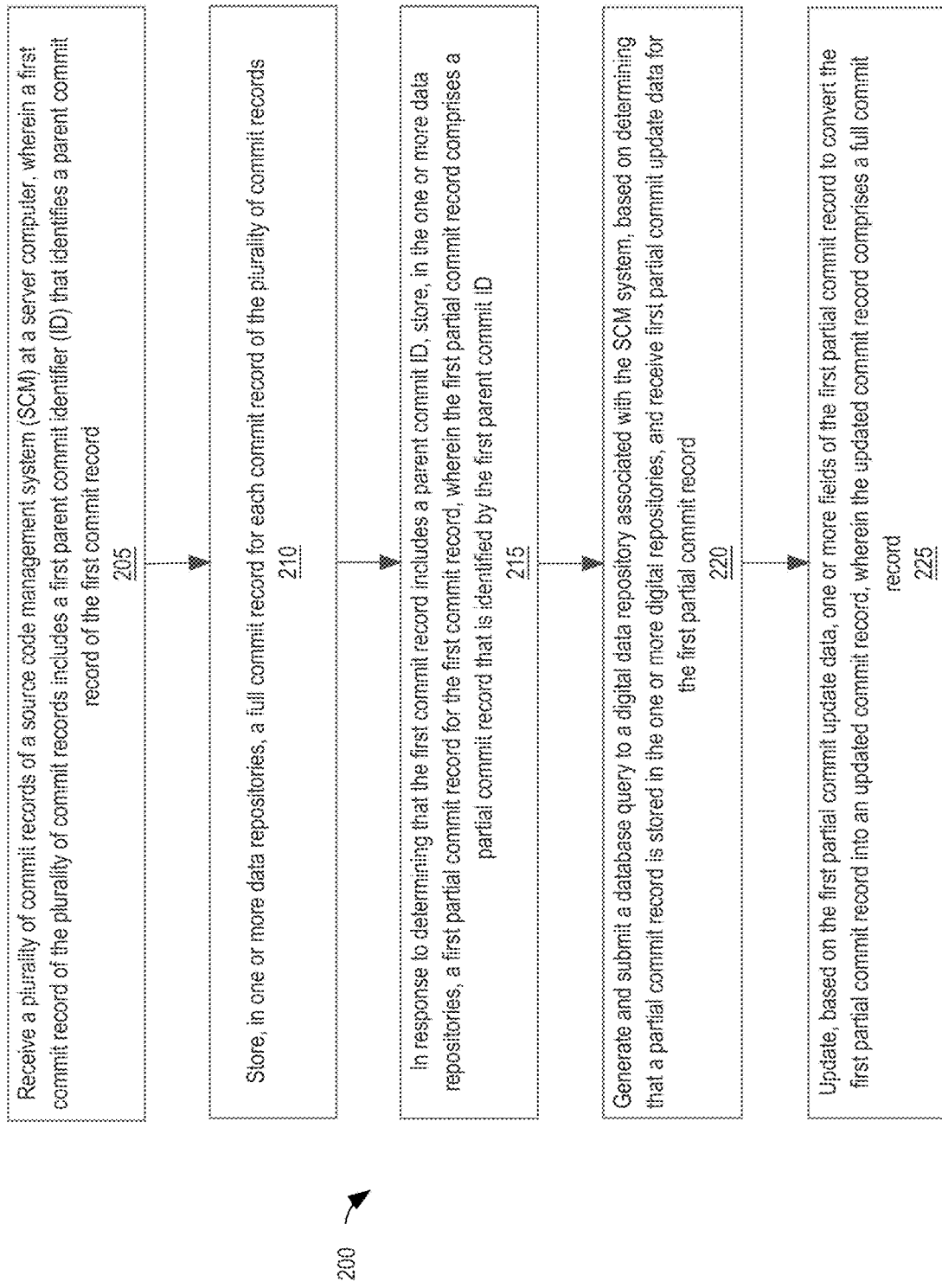
FIG. 2 illustrates a programmable algorithm or method for efficiently storing and analyzing source code modification history data.

FIG. 2 illustrates an example programmable algorithm or method for efficiently storing and analyzing source code modification history data. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 205, a plurality of commit records of a source code management (SCM) system are received at a server computer. A first commit record of the plurality of commit records includes a first parent commit identifier (ID) that identifies a parent commit record of the first commit record. For example, a push webhook notifies the synchronization module 120 of a plurality of commit records and provides the synchronization module 120 with details of the plurality of commit records.

The plurality of commit records may initially be stored in a data repository associated with the SCM. Before step 205 occurs, each commit record stored in the data repository associated with the SCM may be scanned to determine if a commit message associated with the respective commit record includes an issue key. If a commit message of a commit record includes an issue key, the respective commit record is included in the plurality of commit records that are received in step 205. For example, the synchronization module 120 may scan commit records stored in the SCM repository 106 to determine if a commit message associated with the respective commit record includes an issue key. If the commit message associated with the respective commit record includes an issue key, the synchronization module 120 retrieves the commit record from the SCM repository 106 for processing.

In step 210, a full commit record is stored in one or more data repositories for each commit record of the plurality of commit records received in step 205. A full commit record is a commit record that includes a variety of information about the respective commit such as author information, provider information, a commit message, a set of issue keys associated with the commit, and parent commit IDs that identify parent commits of the commit. A full commit record may or may not include parent commit IDs depending on whether or not the commit is related to a parent commit record. For example, the synchronization module 120 may store a full commit record for each commit record of the plurality of commit records in external repository 124 or ITS repository 112.

In step 215, in response to determining that the first commit record includes a parent commit ID, a first partial commit record for the first commit record is stored in the one or more data repositories. The first partial commit record comprises a partial commit record that is identified by the first parent commit ID. A partial commit record is a placeholder commit record that includes an indication that a commit record is not a full commit record. In one embodiment, the indication comprises a partial commit key. A partial commit key may comprise a parent commit ID. The inclusion of a partial commit key in a commit record indicates that the commit record is a partial commit record. In contrast, the absence of a partial commit key in a commit record indicates that the commit record is a full commit record. In some embodiments, each partial commit record is stored in a partial commit index.

Thus, upon receiving a commit record, if the commit record includes a parent commit ID, a partial commit record is created and stored in the one or more data repositories. The partial commit record includes a reference to and is identified by the parent commit ID. For example, the synchronization module 120 determines that a received commit record includes a parent commit ID and in response, stores a partial commit record in external repository 124 or ITS repository 112.

In step 220, a database query is generated and submitted to a digital data repository based on determining that a partial commit record is stored in the one or more digital repositories. First partial commit update data is received for the first partial commit record based on the database query. Partial commit update data comprises data required to update a partial commit record to a full commit record. In one embodiment, partial commit data comprises a full commit record that corresponds to a commit ID associated with a partial commit record.

For example, the synchronization module 120 may scan the external repository 124 or ITS repository 112 to determine whether a partial commit record is stored. This action may include, in some embodiments, scanning the external repository 124 or ITS repository 112 for commit records that include partial commit keys or performing a lookup of the partial commit index to determine if any entries exist. Once the synchronization module 120 determines that a partial commit record exists, the synchronization module 120 generates and submits a query to the SCM repository 106 to retrieve partial commit update data that corresponds to a commit ID associated with the partial commit record.

In some embodiments, the step of determining whether a partial commit record is stored in the one or more digital repositories occurs after a threshold amount of time. For example, the synchronization module 120 may scan the external repository 124 or ITS repository 112 to determine whether a partial commit record is stored on a periodic basis, e.g. once an hour.

In step 225, one or more fields of the first partial commit record are updated based on the first partial commit update data to convert the first partial commit record into an updated commit record. The updated commit record comprises a full commit record. For example, using partial commit update data received in step 220, the synchronization module 120 updates a partial commit record stored the external repository 124 or ITS repository 112 that corresponds to the partial commit update data resulting in an updated commit record. Updating the partial commit record may include the synchronization module 120 updating one or more fields of the partial commit record. Updating one or more fields may include deleting a partial commit key from the partial commit record and/or deleting the partial commit record from a partial commit index.

If the updated commit record includes a parent commit ID, steps 215-225 may repeated for the updated commit record. These steps are recursively executed for each partial commit record until no more partial commit records exist in the one or more digital repositories.

In some embodiments, a digital data display is generated and caused to be displayed at a computer that indicates a commit history of an issue. The commit history of an issue may include one or more commit records associated with an issue key of the issue. The one or more commit records may include a commit record and a parent commit record of the commit record. Commit records included in the commit history may be displayed in a chronological ordering that indicates the parent-child relationship between various commit records. For example, the synchronization module 120 generates a digital display of commit history of an issue and causes the digital display to be displayed at user computer 114.

Figure 3:
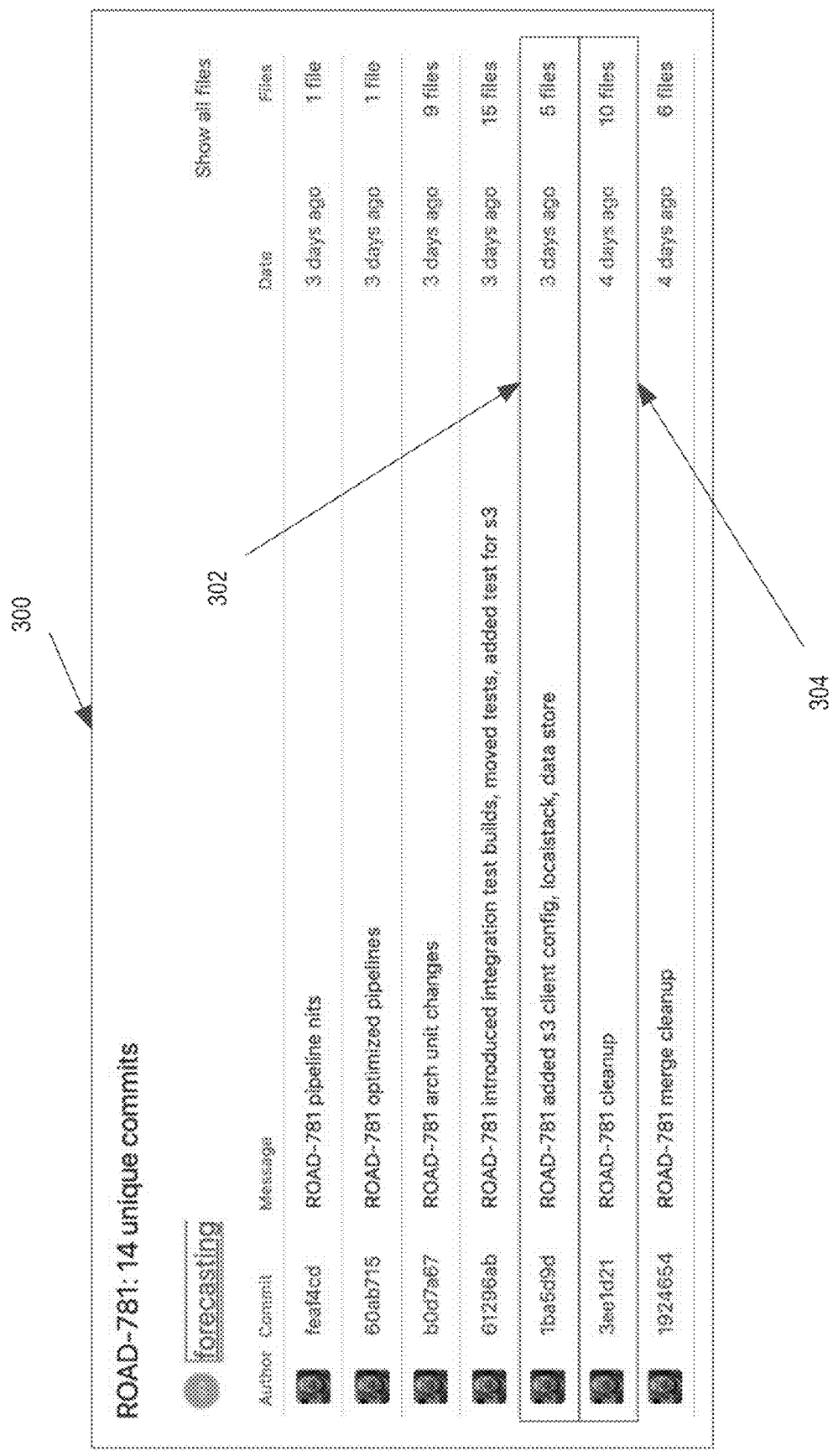
FIG. 3 illustrates an example graphical user interface that displays a commit history of an issue.

FIG. 3 illustrates an example graphical user interface that displays a commit history of an issue. For example, as shown in FIG. 3, commit history of an issue 300 includes a list of different commits and data associated with each commit in the list. Commits 302, 304 include an author, commit ID, message metadata, date, and links to relevant files. In this particular example, the commit history includes several commits which have a parent commit or child commit included in the list, such as commit 304 which is a parent of commit 302. Parent-child commits 304, 303 are displayed in a chronological order of when each commit was published. In some embodiments, the commit history includes a relationship indication (e.g. parent-child) of each commit's relationship to other commits in the commit history.

Using the above described techniques, a robust data hole-filling process is provided that is able mitigate the effects of synchronization disruptions. For example, partial commit records stored for parent commits serve as progress markers for the synchronization process. If a synchronization disruption occurs, synchronization can be resumed using partial commit records as starting points. Thus, by having each commit record store a reference to parent commits, a synchronization process between an ITS and SCM system is able to incrementally keep track of its progress and effectively resume after disruptions without having to repeat processing operations.

By effectively dealing with disruptions, the techniques herein permit synchronizing data between systems with fewer CPU cycles and less memory needed. Further, the techniques herein provide a failsafe and robust approach of synchronizing data between systems that ensures the precise completion of large-scale synchronization procedures.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
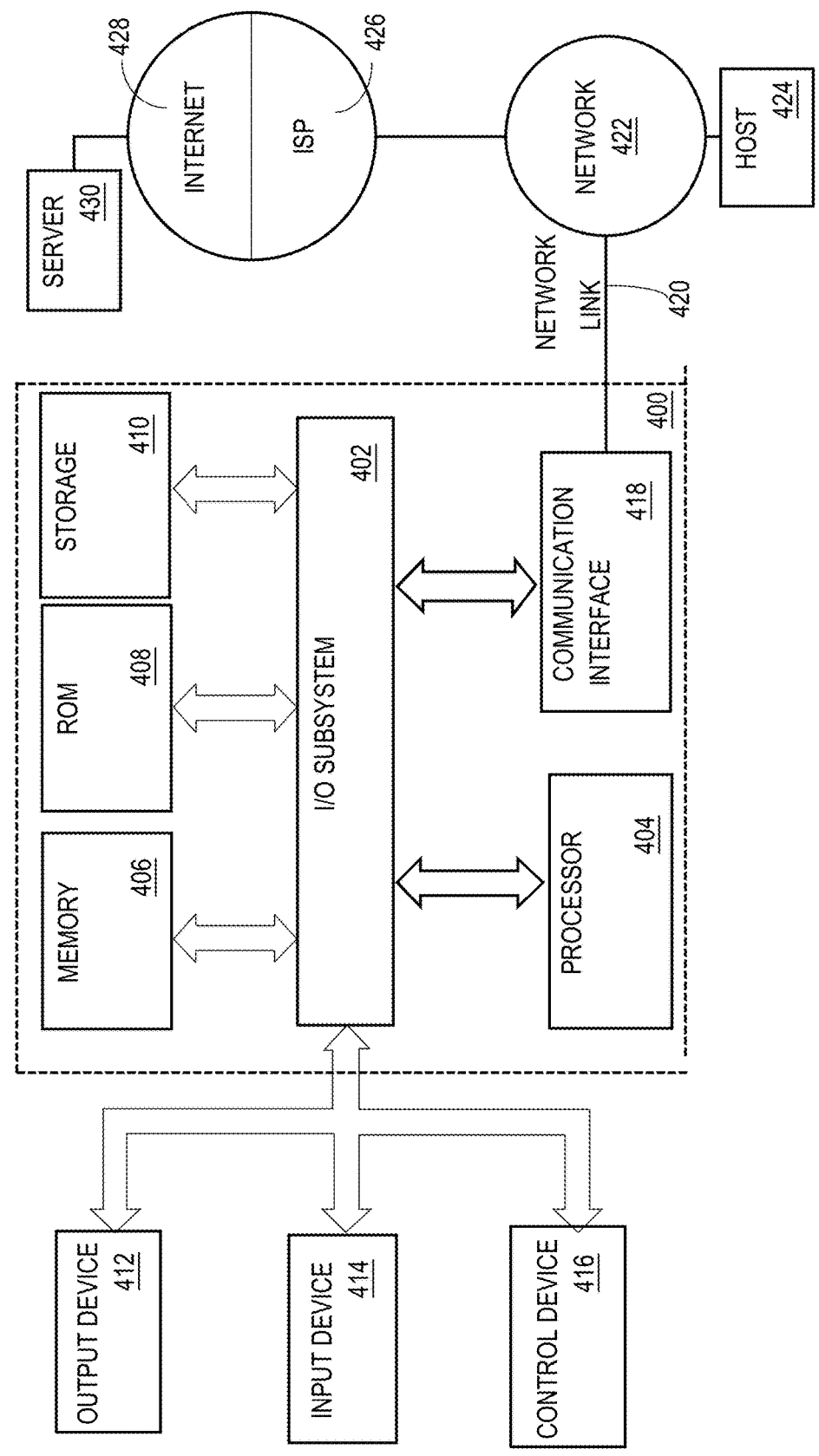
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, at a server computer, a plurality of commit records of a source code management (SCM) system, wherein a first commit record of the plurality of commit records includes a first parent commit identifier (ID) that identifies a parent commit record of the first commit record;

storing, in one or more digital data repositories, a full commit record for each commit record of the plurality of commit records;

in response to determining that the first commit record includes a parent commit ID, storing, in the one or more digital data repositories, a first partial commit record for the first commit record, wherein the first partial commit record comprises a partial commit record that is identified by the first parent commit ID;

generating and submitting a database query to a digital data repository associated with the SCM system, based on determining that a partial commit record is stored in the one or more digital data repositories, and receiving first partial commit update data for the first partial commit record;

updating, based on the first partial commit update data, one or more fields of the first partial commit record to convert the first partial commit record into an updated commit record, wherein the updated commit record comprises a full commit record.

2. The method of claim 1, wherein each commit record of the plurality of commit records includes one or more issue keys.

3. The method of claim 1, wherein each commit record of the plurality of commit records includes a commit ID that identifies the respective commit record.

4. The method of claim 1, wherein the first partial commit record for the first commit record includes a partial commit key that indicates that the partial commit record is not a full commit record.

5. The method of claim 1, wherein the updated commit record includes a second parent commit ID, further comprising:

in response to determining that the updated commit record includes a parent commit ID, storing, in the one or more digital data repositories, a second partial commit record for the updated commit record, wherein the second partial commit record comprises a partial commit record that is identified by the second parent commit ID;

generating and submitting a database query to a digital data repository, based on determining that a partial commit record is stored in the one or more digital data repositories, and receiving second partial commit update data for the second partial commit record;

updating, based on the second partial commit update data, one or more fields of the second partial commit record to convert the second partial commit record into a full commit record.

6. The method of claim 1, further comprising: generating and causing displaying, at a computer, a digital data display that indicates a commit history of an issue.

7. The method of claim 6, wherein the commit history of an issue includes one or more commit records associated with an issue key of the issue, the one or more commit records including the first commit record and updated commit record.

8. The method of claim 7, wherein the first commit record and updated commit record are displayed in a chronological ordering that indicates a parent-child relationship between the first commit record and updated commit record.

9. A computer system comprising:
one or more processors;
one or more memories storing instructions which, when executed by the one or more processors, cause the one or more processors to perform:

receiving, at a server computer, a plurality of commit records of a source code management (SCM) system, wherein a first commit record of the plurality of commit records includes a first parent commit identifier (ID) that identifies a parent commit record of the first commit record;

storing, in one or more digital data repositories, a full commit record for each commit record of the plurality of commit records;

in response to determining that the first commit record includes a parent commit ID, storing, in the one or more digital data repositories, a first partial commit record for the first commit record, wherein the first partial commit record comprises a partial commit record that is identified by the first parent commit ID;

generating and submitting a database query to a digital data repository associated with the SCM system, based on determining that a partial commit record is stored in the one or more digital data repositories, and receiving first partial commit update data for the first partial commit record;

updating, based on the first partial commit update data, one or more fields of the first partial commit record to convert the first partial commit record into an updated commit record, wherein the updated commit record comprises a full commit record.

10. The system of claim 9, wherein each commit record of the plurality of commit records includes one or more issue keys.

11. The system of claim 9, wherein each commit record of the plurality of commit records includes a commit ID that identifies the respective commit record.

12. The system of claim 9, wherein the first partial commit record for the first commit record includes a partial commit key that indicates that the partial commit record is not a full commit record.

13. The system of claim 9, wherein the updated commit record includes a second parent commit ID, further comprising:

in response to determining that the updated commit record includes a parent commit ID, storing, in the one or more digital data repositories, a second partial commit record for the updated commit record, wherein the second partial commit record comprises a partial commit record that is identified by the second parent commit ID;

generating and submitting a database query to a digital data repository, based on determining that a partial commit record is stored in the one or more digital data repositories, and receiving second partial commit update data for the second partial commit record;

updating, based on the second partial commit update data, one or more fields of the second partial commit record to convert the second partial commit record into a full commit record.

14. The system of claim 9, further comprising: generating and causing displaying, at a computer, a digital data display that indicates a commit history of an issue.

15. The system of claim 14, wherein the commit history of an issue includes one or more commit records associated with an issue key of the issue, the one or more commit records including the first commit record and updated commit record.

16. The system of claim 15, wherein the first commit record and updated commit record are displayed in a chronological ordering that indicates a parent-child relationship between the first commit record and updated commit record.

17. One or more non-transitory computer readable media storing one or more sequences of instructions which, when executed by one or more processors, cause:
- receiving, at a server computer, a plurality of commit records of a source code management (SCM) system, wherein a first commit record of the plurality of commit records includes a first parent commit identifier (ID) that identifies a parent commit record of the first commit record;
- storing, in one or more digital data repositories, a full commit record for each commit record of the plurality of commit records;
- in response to determining that the first commit record includes a parent commit ID, storing, in the one or more digital data repositories, a first partial commit record for the first commit record, wherein the first partial commit record comprises a partial commit record that is identified by the first parent commit ID;
- generating and submitting a database query to a digital data repository associated with the SCM system, based on determining that a partial commit record is stored in the one or more digital data repositories, and receiving first partial commit update data for the first partial commit record;
- updating, based on the first partial commit update data, one or more fields of the first partial commit record to convert the first partial commit record into an updated commit record, wherein the updated commit record comprises a full commit record.

18. The one or more non-transitory computer readable media of claim 17, wherein the first partial commit record for the first commit record includes a partial commit key that indicates that the partial commit record is not a full commit record.

19. The one or more non-transitory computer readable media of claim 17, wherein the updated commit record includes a second parent commit ID, the sequences of instructions including instructions that, when executed by the one or more processors, cause:
- in response to determining that the updated commit record includes a parent commit ID, storing, in the one or more digital data repositories, a second partial commit record for the updated commit record, wherein the second partial commit record comprises a partial commit record that is identified by the second parent commit ID;
- generating and submitting a database query to a digital data repository, based on determining that a partial commit record is stored in the one or more digital data repositories, and receiving second partial commit update data for the second partial commit record;
- updating, based on the second partial commit update data, one or more fields of the second partial commit record to convert the second partial commit record into a full commit record.

20. The one or more non-transitory computer readable media of claim 17, the sequences of instructions including instructions that, when executed by the one or more processors, cause generating and causing displaying, at a computer, a digital data display that indicates a commit history of an issue.

* * * * *